(12) United States Patent
Radzyner et al.

(10) Patent No.: US 11,895,989 B2
(45) Date of Patent: Feb. 13, 2024

(54) AUTOMATED BEEHIVE CONTROL AND MANAGEMENT

(71) Applicant: Beewise Technologies LTD, Kibbutz Beit-Haemek (IL)

(72) Inventors: Eliyah Radzyner, Sunnyvale, CA (US); Hallel Ilan Schreier, Doar-Na Oshrat (IL); Rya Seltzer, Moshav Bar Giora (IL)

(73) Assignee: Beewise Technologies LTD, Kibbutz Beit-Haemek (IL)

( * ) Notice: Subject to any disclaimer, the term of this patent is extended or adjusted under 35 U.S.C. 154(b) by 0 days.

(21) Appl. No.: 17/857,071

(22) Filed: Jul. 4, 2022

(65) Prior Publication Data

US 2024/0000047 A1 Jan. 4, 2024

(51) Int. Cl.
*A01K 47/00* (2006.01)
*A01K 47/06* (2006.01)

(52) U.S. Cl.
CPC .................. *A01K 47/06* (2013.01)

(58) Field of Classification Search
CPC ........ A01K 59/00; A01K 47/00; A01K 51/00; A01K 53/00; A01K 67/00
See application file for complete search history.

(56) References Cited

U.S. PATENT DOCUMENTS

| | | |
|---|---|---|
| 3,456,056 A | 7/1969 | Reich et al. |
| 3,789,443 A | 2/1974 | Cowen |
| 3,914,812 A | 10/1975 | Kent |
| 3,999,237 A | 12/1976 | Solomon |
| 6,475,061 B1 | 11/2002 | Huang |
| 6,524,058 B1 | 2/2003 | Watters |
| 8,602,837 B1 | 12/2013 | Allan |
| 10,645,910 B1 * | 5/2020 | Gil Gonzalez ........ A01K 59/00 |
| 10,757,921 B1 * | 9/2020 | Wood ..................... A01K 51/00 |
| 2002/0086430 A1 | 7/2002 | Hopmeier |
| 2012/0202403 A1 | 8/2012 | Sinanis et al. |
| 2014/0212520 A1 * | 7/2014 | Del Vecchio ........ A61K 36/886 |
| 2014/0370781 A1 * | 12/2014 | Anderson ............. A01K 47/04 |

(Continued)

FOREIGN PATENT DOCUMENTS

| | | |
|---|---|---|
| CN | 106719106 | 5/2017 |
| DE | 202006007269 | 8/2006 |

(Continued)

OTHER PUBLICATIONS

European Search Report and the European Search Opinion dated Feb. 2, 2023 From the European Patent Office Re. Application No. 22197442.1. (7 Pages).

(Continued)

*Primary Examiner* — Joshua J Michener
*Assistant Examiner* — Henry Hooper Mudd

(57) ABSTRACT

A method, system, and computer program product for automated beehive control and management. Information related to a content of a beehive is acquired by at least one sensor. The information from the at least one sensor is received and analyzed to determine at least one attribute of at least one substance monitored in the content. Based on the at least one attribute, at least one actuator of the beehive is instructed to maneuver at least one mechanical component affecting at least a portion of an internal environment of the beehive.

19 Claims, 5 Drawing Sheets

(56) References Cited

U.S. PATENT DOCUMENTS

| | | | |
|---|---|---|---|
| 2015/0049919 A1* | 2/2015 | Humal | A01K 51/00 |
| 2016/0015007 A1 | 1/2016 | Sinanis | |
| 2017/0064931 A1 | 3/2017 | Tagliaferri | |
| 2017/0360010 A1 | 12/2017 | Wilson-Rich | |
| 2018/0160656 A1 | 6/2018 | Ben-Shimon et al. | |
| 2018/0288977 A1 | 10/2018 | Hummer et al. | |
| 2020/0049919 A1* | 8/2020 | Symes | A01K 47/06 |
| 2020/0267945 A1* | 8/2020 | Symes | A01K 47/06 |
| 2020/0349397 A1* | 11/2020 | Criswell | G06K 9/62 |
| 2021/0161107 A1 | 6/2021 | Gamberoni et al. | |
| 2021/0289765 A1 | 9/2021 | Scofield et al. | |
| 2022/0022429 A1* | 1/2022 | Hummer | A01K 51/00 |

FOREIGN PATENT DOCUMENTS

| | | | | |
|---|---|---|---|---|
| DE | 102013006265 | | 10/2014 | |
| IL | WO2019/092731 A1 | * | 5/2019 | A01K 47/02 |
| IT | UB20159742 | | 6/2017 | |
| KR | 10-2012-0060253 | | 6/2012 | |
| WO | WO 2012/108857 | | 8/2012 | |
| WO | WO 2019/092731 | | 5/2019 | |

OTHER PUBLICATIONS

Official Action dated Apr. 4, 2022 From the US Patent and Trademark Office Re. U.S. Appl. No. 16/872,769. (64 Pages).
Official Action dated Nov. 21, 2022 From the US Patent and Trademark Office Re. U.S. Appl. No. 17/737,147. (59 Pages).

* cited by examiner

AUTOMATED BEEHIVE CONTROL AND MANAGEMENT

FIELD AND BACKGROUND OF THE INVENTION

Some embodiments described in the present disclosure relate to beekeeping and, more specifically, but not exclusively, to automated beehive control and management.

Beekeeping, also referred to as apiculture, is the maintenance of bee colonies in hives, for various applications and purposes including, for example the production and collection of hive contents and produce such as honey, beeswax, propolis, pollen, royal jelly, and or the like; the pollination of crops; production of bees for breeding and/or sale to others; and/or the like.

Modern beehives where domesticated bee colonies are accommodated typically comprise a rectangular-shaped casing or box body in which there are movably mounted several parallel frames that house plates of wax-made honeycomb and/or brood combs containing eggs, larvae, pupae and food storages of honey, pollen, nectar, royal jelly and/or the like.

Movable comb frames allow for removal and/or manipulation of the honey and/or brood combs for honey harvesting as well as periodic inspection and/or management without destruction of the beehive and/or infliction of permanent damage to the comb and/or the hive otherwise.

It is long recognized that bees have a vital and crucial role in the preservation of nature's ecological balance and biological diversity, in general, and the viable agricultural production of crops and/or other grown produce, in particular.

SUMMARY OF THE INVENTION

It is an object of the present disclosure to describe a system and a method for automated beehive control and management.

The foregoing and other objects are achieved by the features of the independent claims. Further implementation forms are apparent from the dependent claims, the description and the figures.

According to one aspect of some embodiments of the disclosed subject matter there is provided a system for automated beehive control and management, comprising: at least one sensor configured for acquiring information related to a content of a beehive; at least one processing circuitry being in communication with at least one actuator of the beehive and adapted for: receiving the information from the at least one sensor; analyzing the information to determine at least one attribute of at least one substance monitored in the content; and based on the at least one attribute, instructing the at least one actuator to maneuver at least one mechanical component affecting at least a portion of an internal environment of the beehive.

According to another aspect of some embodiments of the disclosed subject matter there is provided a method for automated beehive control and management, comprising: receiving from at least one sensor information related to a content of a beehive; analyzing the information to determine at least one attribute of at least one substance monitored in the content; and based on the at least one attribute, instructing at least one actuator of the beehive to maneuver at least one mechanical component affecting at least a portion of an internal environment of the beehive.

According to yet another aspect of some embodiments of the disclosed subject matter there is provided a computer program product comprising: a non-transitory computer readable storage medium; program instructions for executing, by a processor, a method for automated beehive control and management, the method comprising: receiving from at least one sensor information related to a content of a beehive; analyzing the information to determine at least one attribute of at least one substance monitored in the content; and based on the at least one attribute, instructing at least one actuator of the beehive to maneuver at least one mechanical component affecting at least a portion of an internal environment of the beehive.

Optionally, the at least one sensor comprising at least one member selected from the group consisting of: (i) an imaging sensor selected from the group consisting of: a visual light camera accompanied with a light source; an electromagnetic radiation imaging device; an Infrared (IR) imaging device; an Ultraviolet (UV) imaging device; a depth camera; a thermal vision camera; a spectral imaging sensor; a scanner; a light detection and ranging (LiDAR) device; and a radio azimuth direction and ranging (RADAR) device; (ii) an acoustic sensor selected from the group consisting of: a microphone; an ultrasonic sensor device; and a Doppler ranging device; (iii) a chemical sensor; and (iv) a mass density measuring device selected from the group consisting of: a weight scale; and a mass scale.

Optionally, the at least one processing circuitry being in communication with a storage device and further adapted for recording in the storage device the set of attributes determined for the at least one substance.

More optionally, the at least one processing circuitry being further adapted for associating with the set of attributes and recording in the data storage device a respective timestamp.

Optionally, the beehive comprising at least one adjustable opening for enabling bees to enter and exit the beehive and a mechanism for controlling a size of the at least one adjustable opening, the mechanism comprising a mechanical arrangement configured for selectively enlarging and diminishing the at least one adjustable opening, wherein the mechanical arrangement is configured for being maneuvered by the at least one actuator and wherein the instructing comprising instructing the at least one actuator to maneuver the mechanical arrangement for adjusting the size of the at least one adjustable opening.

Optionally, the beehive comprising at least one modular unit and a mechanism for controlling a composite and/or subdivision configuration of the at least one modular unit, the mechanism comprising a mechanical arrangement configured for being maneuvered by the at least one actuator and for at least one of: selectively dividing one or more of the at least one modular unit into a plurality of sub units; and, selectively merging to a super unit a plurality of the at least one modular unit and/or sub units; wherein the instructing comprising instructing the at least one actuator to maneuver the mechanical arrangement for configuring the at least one modular unit, the configuring comprising at least one of: merging a plurality of the at least one modular unit and/or sub units into a super unit; and dividing one or more of the at least one modular unit and/or plurality of sub units; wherein a modular unit of the at least one modular unit is adapted for providing functionality of a stand-alone hive.

Optionally, the beehive comprising at least one modular unit comprising a volumetrically adjustable space and a mechanism for controlling capacity of one or more of the at least one modular unit, the mechanism comprising a mechanical arrangement configured for being maneuvered by the at least one actuator and for selectively expanding or contracting the volumetrically adjustable space of one or more of the at least one modular unit, wherein the instructing comprising instructing the at least one actuator to maneuver the mechanical arrangement for adjusting capacity of one or more the at least one modular unit.

Optionally, the beehive comprising a mechanical arrangement for climate control configured for being maneuvered by the at least one actuator, wherein the instructing comprising instructing the at least one actuator to maneuver the mechanical arrangement for climate control so as to set at least one climate condition of the beehive.

Optionally, the beehive comprising at least one substance delivery mechanism coupled to at least one substance reservoir, the substance delivery mechanism comprising a mechanical arrangement configured for being maneuvered by the at least one actuator, wherein the instructing comprising instructing the at least one actuator to maneuver the mechanical arrangement for delivering into the beehive a predefined amount of content from the at least one substance reservoir.

Optionally, the beehive comprising: an automated honey harvesting arrangement configured for being operated by the at least one processing circuitry to receive and harvest honey from a removable portion of the beehive, and a mechanical arrangement configured for repositioning the removable portion from a first location in the beehive to the automated honey harvesting arrangement; wherein the instructing comprising instructing the at least one actuator to maneuver the mechanical arrangement for repositioning the removable portion in the automated honey harvesting arrangement, and instructing the automated honey harvesting arrangement to harvest honey from the removable portion.

Optionally, the at least one processing circuitry being further adapted for: receiving an input indicative of at least one of agricultural, environmental and geographical data relating to a surrounding environment in which the beehive being located; and determining, based on the input and the at least one attribute, at least one travel behavior characteristic of occupant bees of the beehive; wherein the at least one processing circuitry being further adapted for instructing the at least one actuator to maneuver the at least one mechanical component based on the at least one travel behavior characteristic.

Optionally, the at least one processing circuitry being further adapted for providing, based on the at least one attribute, an output of at least one of: a user alert; and, an indication of a user action to be performed in relation to the beehive.

Optionally, the at least one attribute comprising one or more attributes selected from the group consisting of: substance presence; substance amount; substance type; substance color; substance chemical composition; substance purity; substance sugar concentration level; pollen type; nectar type.

Optionally, the at least one substance comprising one or more substances selected from the group consisting of: pollen; nectar; soil; plant part; resin; tree sap; water; ash; pests.

Optionally, the beehive comprising: an automated pest control arrangement configured for being operated by the at least one processing circuitry to receive and treat pests in a removable portion of the beehive, and mechanical arrangement for repositioning the removable portion from a first location in the beehive to the automated pest control arrangement; wherein the instructing comprising instructing the at least one actuator to maneuver the mechanical arrangement for repositioning the removable portion in the automated pest control arrangement, and instructing the automated pest control arrangement to treat the removable portion against pests.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 3A:
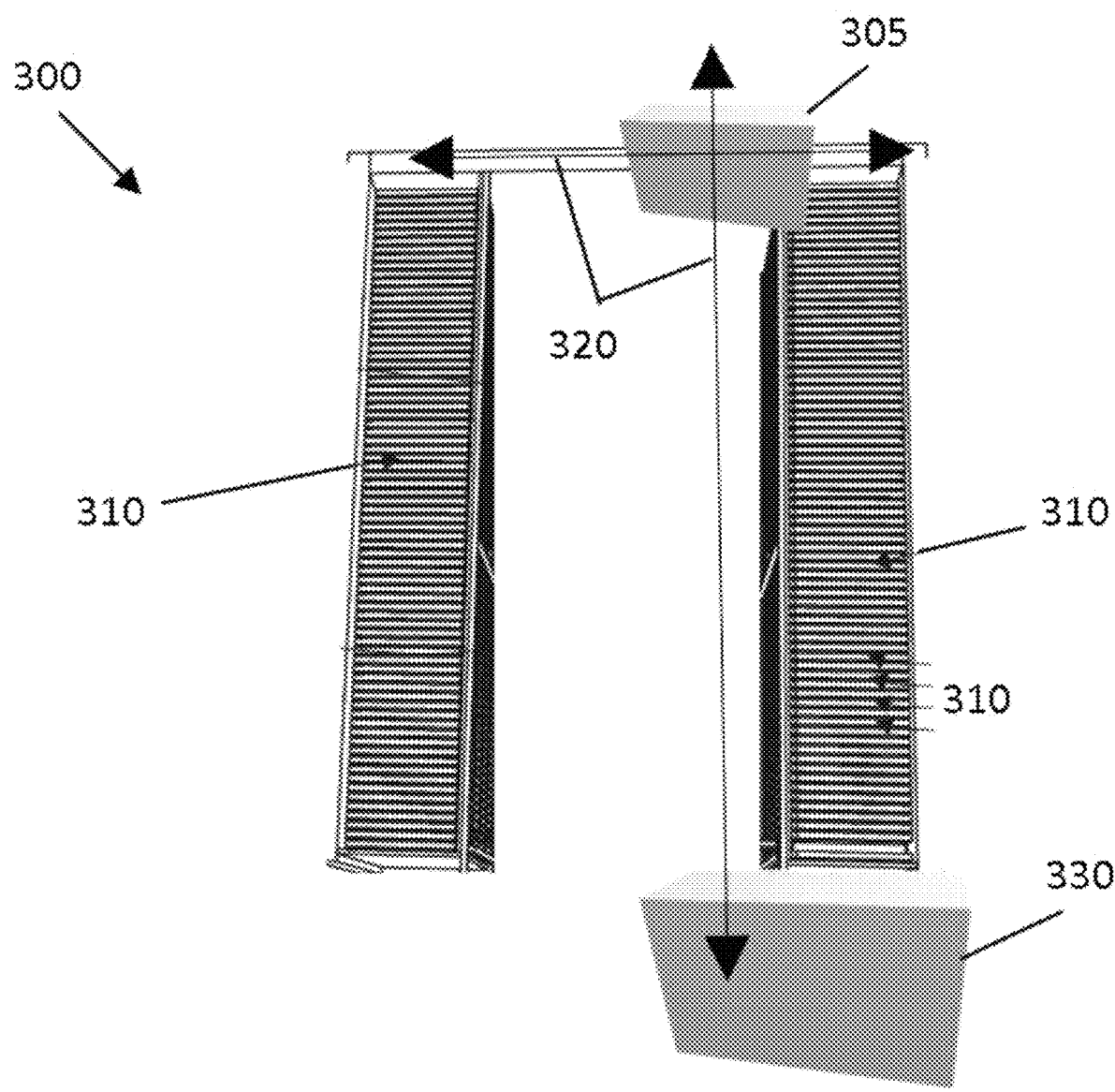
FIG. 3A is a schematic illustration of an exemplary automated beehive assembly in which the disclosed subject matter may be utilized, according to some embodiments.
Figure 3B:
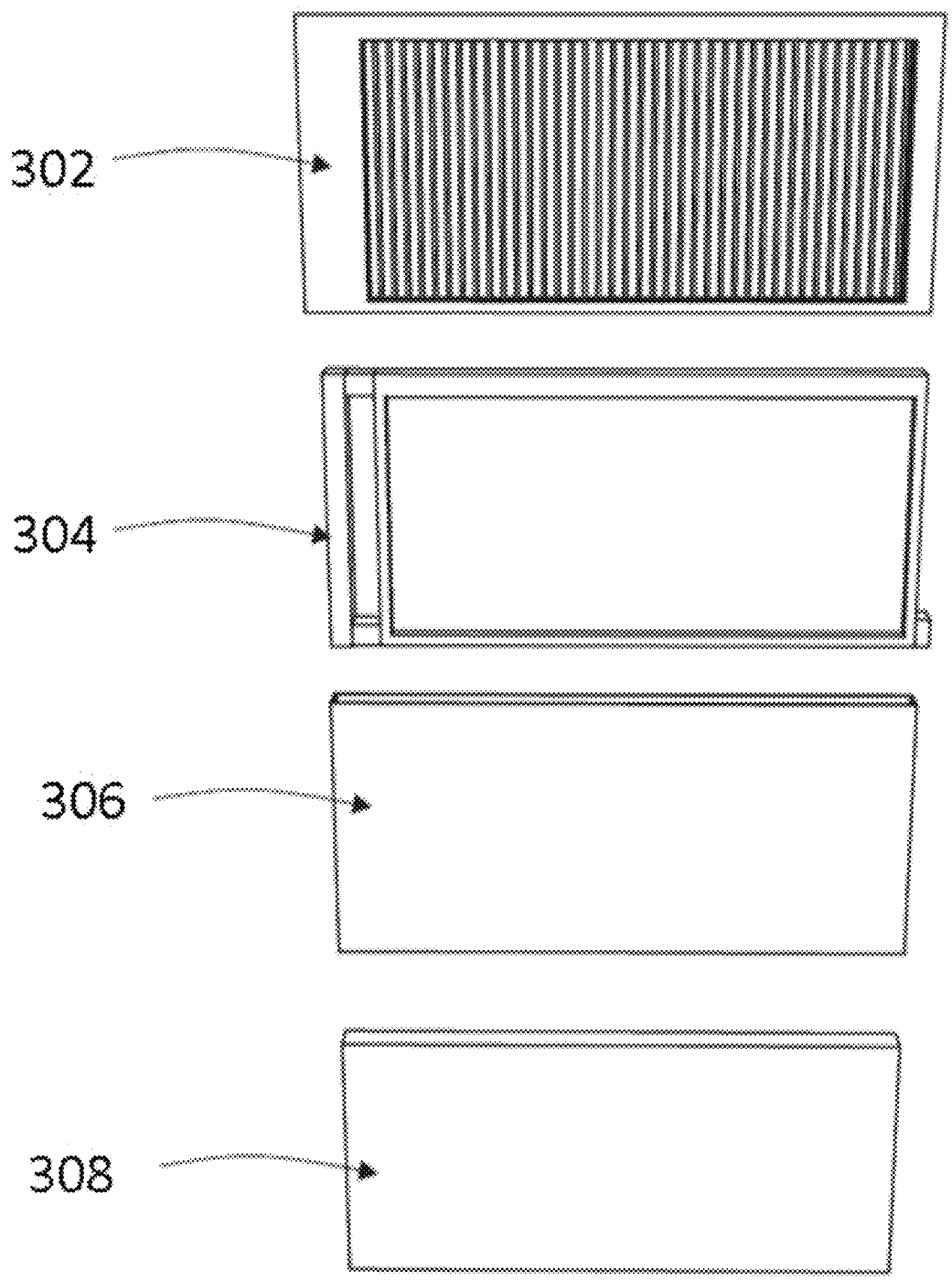
Figure 3C:
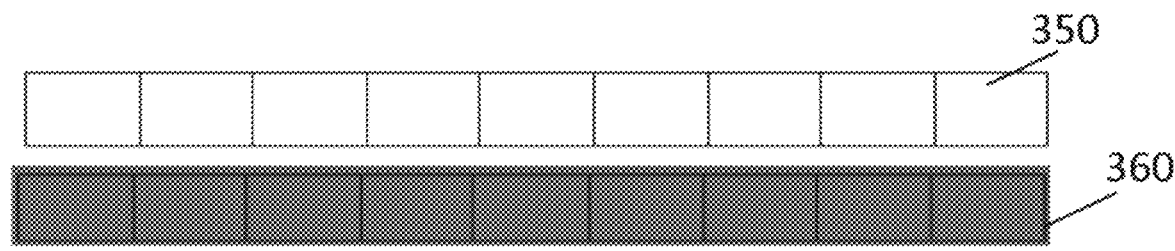
Figure 3D:
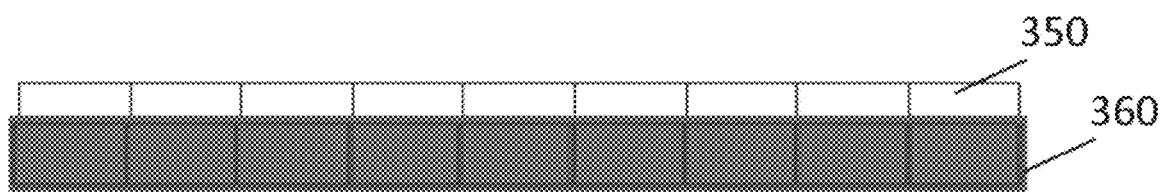
Figure 3E:
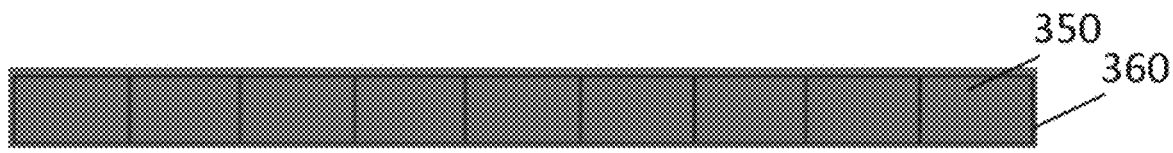

FIG. 3B is a schematic illustration of exemplary frame types other than honeycomb that may be mounted onto a beehive such as depicted in FIG. 3A, in control and management of the beehive according to some embodiments; and FIGS. 3C-3E are schematic illustrations of exemplary configurations of openings and shutter of a beehive such as depicted in FIG. 3A, manipulated in control and management of the beehive according to some embodiments.

DESCRIPTION OF SPECIFIC EMBODIMENTS OF THE INVENTION

Some embodiments described in the present disclosure relate to beekeeping and, more specifically, but not exclusively, to automated beehive control and management.

In some embodiments, there is provided a beehive equipped with one or more mechanical arrangements for reconfiguration of the beehive and/or change in conditions and/or a pre-existing state thereof in an automated and/or semi-automated manner with minimal and/or no user intervention.

Such mechanical arrangements may include, for example, arrangements for removal of comb frames mounted in a housing of the beehive and/or insertion of additional comb frames into vacant slots therein, arrangements for controlling a size of at least one opening of the beehive where bees exit from and/or enter into the beehive, arrangements for climate control of the beehive such as air conditioners, ventilators, fans, heaters, air convection systems, and/or the like, arrangements for honey harvesting such as centrifuge honey extractors and/or the like, arrangements for pest treatment and/or the like, arrangements for delivering additional food and/or supplemental nutrients into the beehive, and/or any likewise arrangements for beehive management.

Optionally the beehive may comprise one or more modular units capable of being sub-divided into a plurality of sub-units and/or (re-)merged together into a super unit such that the hives accommodated therein may be divided and/or merged accordingly. A mechanism for controlling and mechanically effecting a composite and/or subdivision (re-)configuration of the modular unit(s) of the beehive may be provided so that division and/or merging of hives may be performed automatically.

Similarly, a modular unit may comprise a space that is volumetrically adjustable such that a capacity of the modular unit, i.e. an available space and/or number of frames for accommodating bees therein, may be selectively modified, e.g., decreased and/or increased. A mechanism for controlling and mechanically effecting an adjustment in capacity of the modular unit in an automated manner may be provided also.

An exemplary automatic beehive assembly with a hive chamber for housing a plurality of releasable frames, and mechanical arrangements for removing and/or inserting frames from and/or into the hive chamber, honey harvesting, bees feeding, climate control, pest treatment, and/or the like in which the disclosed subject matter may be utilized is described for example in patent application publication no. WO 2019/092731 A1, entitled "AUTOMATIC BEEHIVES", which is hereby incorporated by reference in its entirety without giving rise to disavowment.

One or more sensor(s) of one or more sensor types may be deployed within the beehive and/or at a vantage point where contents of the beehive and/or at least a portion thereof can be detected and/or otherwise probed by the sensor(s), such as for example in a location at which comb frames may be mobilized thereto outwardly from the beehive for inspection and/or collection of a sample and/or the like.

Types of sensors utilized may comprise imaging sensors, such as for example a visual light camera, which may optionally be accompanied with a suitable light source, an electromagnetic radiation imaging device, an Infrared (IR) imaging device, an Ultraviolet (UV) imaging device, a thermal vision camera, a depth camera, a spectral imaging sensor, a scanner, a three-dimensional scanner, a light detection and ranging (LiDAR) device, a radio azimuth direction and ranging (RADAR) device, and/or the like. Additionally or alternatively, the sensors may comprise acoustic sensors, such as for example a microphone, a sonar, an ultrasonic sensor device, a Doppler ranging device, and/or the like. Additionally or alternatively, the sensors may comprise chemical sensors for detecting presence and/or properties of particular substances and/or compositions. Additionally or alternatively, the sensors may comprise mass density sensor(s) and/or measuring devices such as for example a weight scale, a mass scale, and/or the like.

Data acquired by the sensor(s) may be analyzed to determine at least one attribute of at least one substance monitored in the contents of the beehive. Based on the attribute(s) determined, a determination may be made on at least one action to be performed in effect on the beehive's internal environment and/or portion thereof, and accordingly an instruction may be issued to an actuator of the beehive for maneuvering a respective one of the mechanical arrangements and/or a mechanical component therein for carrying out a respective one of the at least one action automatically without requiring user intervention.

Exemplary actions that may be automatically performed in response to the determination of attribute(s) of the monitored substance(s) may comprise one or more of the following:

adjusting a size of at least one adjustable opening of a beehive housing unit for enabling bees to enter and exit the beehive, e.g., by selectively enlarging and/or diminishing the size using a mechanical shutter arrangement and/or likewise mechanism;

dividing a beehive housing unit of a plurality of frames into several sub-units comprising respective portions of the plurality of frames, e.g., by inserting one or more buffering frames therebetween using a mechanical frame loader arrangement such as a robotic arm and/or the like;

merging together two or more beehives in sub-units of a beehive housing unit, e.g., by removing of pre-inserted buffer(s) and/or replacing buffering frames by regular comb and/or vacant frames, using the mechanical frame loader arrangement and/or the like;

adjusting a volume and/or capacity of a beehive housing unit of a plurality of frames, e.g., by selectively expanding and/or contracting a space available for bees accommodated in the beehive housing unit, via removal of pre-inserted buffering frame(s) and/or insertion of newly introduced and/or further buffer frame(s) respectively, and/or through substitution of buffer frame(s) by regular comb and/or vacant frames, and/or vice versa, using the mechanical frame loader arrangement and/or the like;

adjusting a climate condition of a beehive housing unit, e.g., by operating an arrangement for climate control such as an air conditioner and/or the like;

delivering into a beehive housing unit a material and/or substance from a reservoir, e.g., by operating a substance delivery mechanical arrangement and/or the like;

harvesting honey from one or more of a plurality of frames of a beehive housing unit, e.g., by removal of a frame and placing thereof in an automated honey harvesting mechanical arrangement and/or the like;

treating one or more of a plurality of frames of a beehive housing unit against pests, e.g., by removal of a frame and placing thereof in a designated treatment unit coupled to the beehive and/or the like.

Optionally a determination of further action(s) required to be performed by a user may be made based on the attribute(s) of monitored substance(s) determined, and an indication of such action(s) may be accordingly output to the user. For example, it may be determined that the beehive should be moved by the user to a different location and/or the like.

In some embodiments, contents of the beehive, substances therein and/or attributes thereof to be monitored may comprise and/or relate to one or more substances which may be carried by bees into the beehive. For example, such substances and/or substance types may comprise pollen, nectar, soil, plants and/or plant parts, resin, tree sap, and/or the like, as well as biological entities such as pests, micro-organisms and/or the like. As a person skilled in the art would readily appreciate, bees can bring in and/or introduce to the hive any matter and/or entity originating in an outside surrounding thereof in which the bees travel.

As used herein, the term "substance" may refer to any natural and/or artificial substance, item and/or being, whether still or living, and is not meant to be limiting in any manner. Additionally and/or alternatively, substances carried in by bees may be the product and/or result of a chemical transformation and/or likewise process, such as for example ashes and/or charcoal particles from a fire burning of combustible materials and/or the like.

In some embodiments, attribute(s) of a respective one of the substance(s) monitored may comprise presence and/or absence of the substance in the hive, an amount of the substance in the hive, a level of purity of the substance in the hive, a particular type and/or categorization of the substance, a physical and/or chemical characteristic and/or property of the substance, and/or the like. For example, such attributes may comprise type, color, weight, quantity, percentage, purity and/or the like of a specific substance, chemical composition and/or components of a substance, and/or the like. As a further illustrative example, attributes and/or metrics monitored, identified and/or determined, may comprise for example a pollen type, nectar type, sugar level, and/or the like.

Optionally, the attribute(s) determined may be recorded in a data store for future reference, such as for example in certification of a produce of the beehive and/or its qualities, e.g., purity attestation of produced honey and/or the like, provision of warnings against certain contents, e.g., traces of allergens, chemical residues, and/or the like in honey produced by bees in the beehive, and/or any likewise acknowledgements that may be of interest to users, consumers, regulators, and/or the like. Optionally, an attribute may be associated with a corresponding timestamp that may be recorded therewith in the data store. The recorded historic data of timestamped attribute(s) may be used in data analytics such as for example averaging and/or extremum values calculations, trends identification and/or prediction, correlation of substances present in the hive with one or more parameters that may be detected and/or reported for recordation in the store such as for example honey production, behavior and/or well-being of bees, and/or the like.

For illustrative purposes, some non-limiting examples of use cases in demonstration of a manner in which the disclosed subject matter may be employed are discussed herein as follows:

In response to detection of a low quantity of pollen and/or nectar brought in, e.g., where an overall amount thereof gathered over a predefined period is falling below a predetermined threshold and/or the like, a determination may be made that there is not enough food for the bees and an additional feeding frame may be inserted to a respective hive unit.

Based on a type of pollen detected, a determination may be made at a high level of accuracy as to a source of nectar at a time during which honey has been produced, and accordingly the information may be recorded in a data store and used for certification purposes, data analytics, prediction modelling, and/or the like.

Moreover, a further determination may be made as to whether bees in a hive have been feeding on one or more other and/or additional substances, such as for example sugar, sugar syrup, and/or the like, at the time during which the honey has been produced, and the information may be recorded, used, and/or further processed in a similar manner.

In response to identification of one or more particular substances and/or chemicals that have been brought in by bees to the hive, such as for example pesticides and/or the like, and that by result have been present in the hive at a time during which honey has been produced, an alert to a user may be issued accordingly.

Furthermore, the hive may optionally be divided so that portions thereof where presence of such substances and/or chemicals of adverse effect has been detected may be isolated from other portions determined to be free of those substances and/or chemicals. For example, if gluten is carried in by bees in a first hive but not by bees in a second hive then gluten free honey can be provided by separately harvesting honey from the second hive. This is one exemplary respect in which the disclosed subject matter is advantageous over pre-existing systems and/or methods which are unable to produce honey of different types from a single beehive simultaneously.

Identification of pests brought in may be performed and in response frames may be immediately treated against the pests.

Based on detection of an amount of pollen and/or nectar brought in by bees to the hive, a determination may be made as to whether to reduce and/or increase a size of one or more hive units, such that a capacity of the one or more hive units may be changed in accordance with an amount of food available therein.

More specifically, an average amount of pollen brought in by a single bee may be determined and, based on a change and/or gradient of the average, an increase and/or decrease of available food may be identified and accordingly the capacity may be adjusted.

In response to detection of water drops on bees, a determination may be made that it has been and/or still is raining outside, and a reconfiguration of an air conditioning unit and/or readjustment of one or more openings in order to dry hives may be made.

In response to detection of ashes on bees, a determination may be made that there is a fire outside, and accordingly openings of the beehive may be shut, an air conditioning unit may be activated and/or adjusted to increase throughput, an alert may be output to a user, and/or the like.

Based on a type of pollen detected, a determination may be made as to a plant type the bees visited, and the information may be recorded in a data store and/or used similarly as described herein.

In particular, based on the type of pollen detected, taken in consideration with recorded historical data, pre-stored definitions, user input and/or any other likewise auxiliary information, a determination may be made as to whether the bees started visiting a different type of plant and/or vegetation, and accordingly harvesting may be initiated so that the harvested honey may be kept pure, i.e., sourced from one specific type of plant and/or vegetation. This is another exemplary respect in which the disclosed subject matter is advantageous over pre-existing systems and/or methods which are unable to ascertain where pollen was collected.

Similarly, based on types of pollen detected, a determination may be made that different bees in certain hives visited different vegetations (which may result in the honey not being purely from one type of plant), and a warning and/or suggestion for moving the beehive (e.g., based on the level of impurity of pollen and/or the like) may be generated and outputted to a user, hives may be harvested separately, and/or the like. Additionally or alternatively the information may be recorded in a data store and used in generation of a certificate for the honey and/or the like.

Based on determination and/or detection of a type and/or location of an environment of activity by bees of certain hives (e.g., a type of vegetation where bees collect pollen), a determination may be made to merge these hives together. For example, an identification may be made of a specific pollen type, resin, and/or the like being brought in by bees in hives A and B but not in hive C, which may indicate with high likelihood that bees of hives A and B may be visiting and/or active in a same area, which may be different from an area where bees of hive C may be active, such that it may make sense to merge hives A and B and keep hive C separated therefrom.

Based on a type of pollen and/or nectar detected, a determination may be made as to a type and/or amount of food supply to feed the bees with, such as for example, using more than one type of food and/or different sugar levels in feeding frames and/or the like, so as to balance the bees' diet.

By crossing pollen type detected with data relating to a surrounding environment of the beehive (e.g., maps from a farmer describing where apple and/or orange groves and/or orchards may be located relative to a hive) received as input from a user and/or any likewise origin, a determination may be made as to where bees may be traveling to, how far they may travel, and so on, and the information may be recorded in a data store and/or used similarly as described herein.

Furthermore, based on information regarding a time period during which crops that the bees in a hive may be visiting being and/or may likely be sprayed and/or otherwise treated, openings of that hive may be shut for that time period, but may be kept open when other crops being sprayed and/or treated.

In response to detection of a low quantity of pollen and/or nectar brought in, harvesting may be initiated and/or an output may be provided to inform a user and/or suggest moving the beehive to a location where there may be more nectar and/or different type thereof, in order to maintain purity of the honey, for example.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
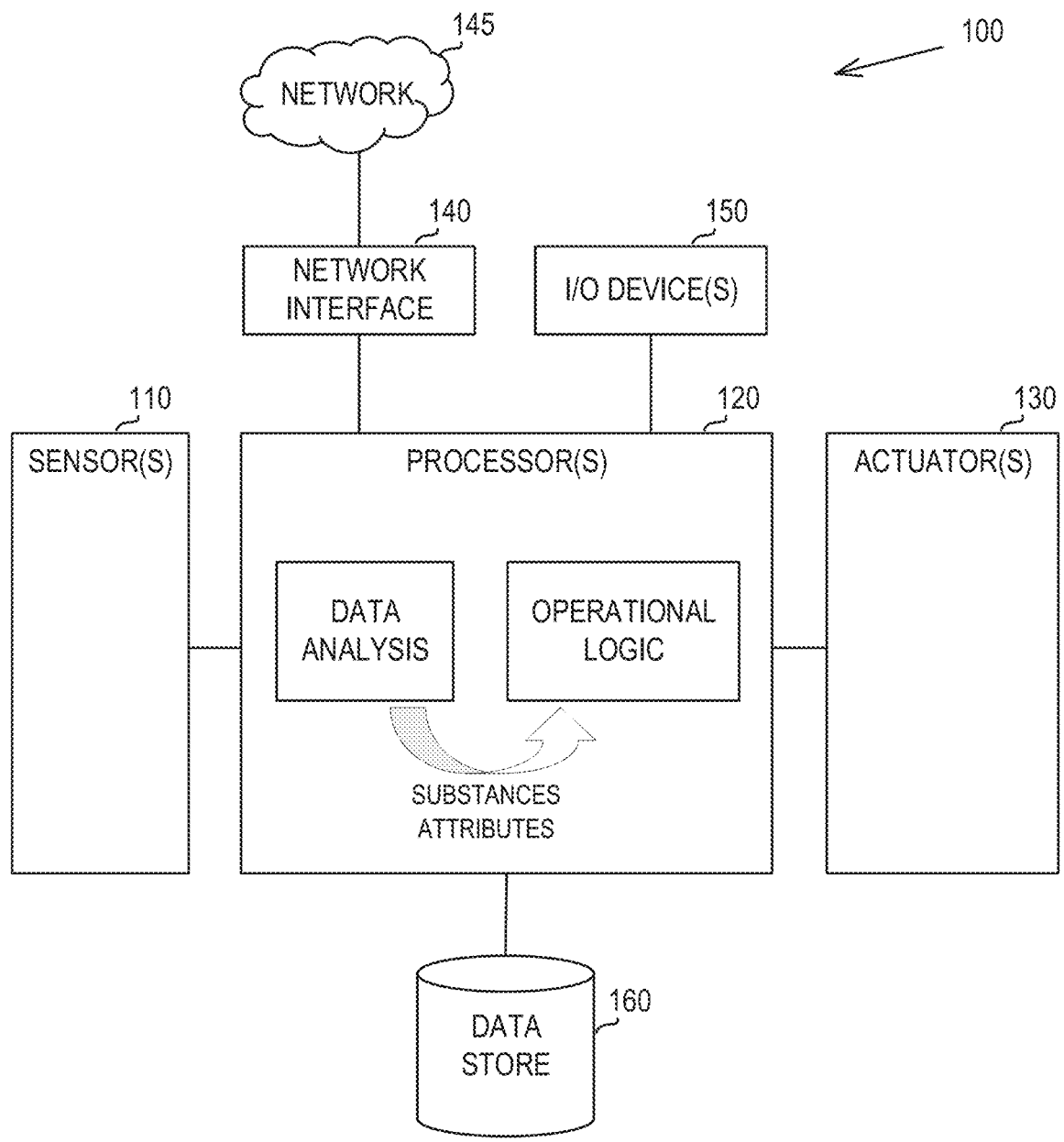
FIG. 1 is a schematic block diagram of an exemplary system for automated beehive control and management, according to some embodiments.

Reference is now made to FIG. 1 which is a schematic block diagram of an exemplary system for automated beehive control and management, according to some embodiments.

A system for automated beehive control and management such as 100 may comprise one or more sensors such as 110 and one or more processors such as 120 coupled to and/or being in communication therewith. The sensor(s) 110 may be configured for acquiring information related to a content of a beehive. The sensor(s) 110 may be deployed within the beehive, at an opening on a boundary of the beehive between an inside and outside portion thereof, at a location outside of the beehive where frames extracted from the beehive may be brought into for inspection and/or treatment, and/or the like. The sensor(s) 110 may comprise image sensor(s) such as camera(s), electromagnetic sensor(s), Infrared (IR) sensor(s), Ultraviolet (UV) sensor(s), thermal camera(s), depth camera(s), scanner(s), and/or the like, acoustic sensor(s) such as microphone(s), sonar(s), ultrasonic sensor(s), Doppler ranging sensor(s), and/or the like, chemical sensor(s), mass density sensor(s) such as weight and/or mass scale(s), and/or the like.

The processor(s) 120 may be residing on, embedded in and/or coupled to one or more computing devices (not shown), which may be implemented as, for example, a standalone unit, a client terminal, a server, a computing cloud, a mobile device, a desktop computer, a thin client, a Smartphone, a Tablet computer, a laptop computer, a wearable computer, and/or the like. The computing device(s) may be implemented as customized unit(s) that include locally stored software and/or hardware that perform one or more of the acts described herein with reference to FIG. 2. Additionally or alternatively, the computing device(s) may be implemented as code instructions loaded on an existing computing device. Additionally or alternatively, the computing device(s) may be implemented as hardware and/or code instructions (e.g., an accelerator card) installed and/or integrated within an existing computing device.

The processor(s) 120 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 120 may include one or more processors (homogenous or heterogeneous), which may be arranged for parallel processing, as clusters and/or as one or more multi core processing units. The processor(s) 120 may comprise and/or be in communication with a memory and/or data storage device (not shown) in which code instructions executable by processor(s) 120 may be stored, such as for example a random access memory (RAM), read-only memory (ROM), and/or a storage device, for example, non-volatile memory, magnetic media, semiconductor memory devices, hard drive, removable storage, and optical media (e.g., DVD, CD-ROM), and/or the like. The memory may store code instructions that implement one or more acts of the optional flow of operations for automated beehive control and management described with reference to FIG. 2 herein. Additionally or alternatively, one or more acts of the optional flow of operations of FIG. 2 may be implemented in hardware.

The system 100 may comprise one or more actuators of the beehive such as 130 for maneuvering one or more mechanical components effecting one or more portions of an internal environment of the beehive. The actuator(s) 130 may comprise for example an actuator of a mechanical arrangement for removing and/or inserting frames from and/or into a hive unit, an actuator of a mechanical arrangement for adjustment of a size of an opening of the beehive, an actuator of a mechanical arrangement for adjustment of a capacity of a hive unit, an actuator of a mechanical arrangement for dividing and/or merging hive unit(s), an actuator of a mechanical arrangement for climate control of the beehive, an actuator of a mechanical arrangement for harvesting honey and/or any likewise other produce of the beehive, an actuator of a mechanical arrangement for delivering additional food and/or supplemental nutrients into the beehive, and/or any actuators of mechanical arrangements for performing other likewise beehive operational actions. The actuator(s) 130 may be configured to maneuver respective mechanical component(s) in accordance with an instruction received from the processor(s) 120.

In some embodiments, one or more of the sensor(s) 110 may be mounted on one or more of the actuator(s) 130. For example, the beehive may comprise a robotic arm integrated in a frame loader assembly for extraction and/or insertion of frames, on which a camera and/or the like may be mounted for capturing one or more images of a respective frame removed from the beehive.

The system 100 may comprise a network interface such as 140 for transmission and/or receipt of data over a network such as 145 and/or other suitable communication channel.

Network 145 may be any type of data network, for example, a local area network (LAN), a wireless LAN, a wide area network (WAN), or the connection may be made to an external computer, for example through the Internet using an Internet Service Provider (ISP) and/or any other type of computer network. The wireless LAN may use one or more wireless protocols, including Bluetooth, Bluetooth low energy (BLE), 802.11 compliant wireless local area network (WLAN), and/or any other wireless LAN protocol. Network 145 may use networking protocols, for example Transmission Control Protocol and Internet Protocol (TCP/IP), Asynchronous Transfer Mode (ATM), asymmetric digital subscriber line (ADSL), and/or any other networking protocol. Network 145 may comprise one or more routers, wireless routers, hubs, smart hubs, switches, smart switches, and/or any other type of networking equipment.

In some embodiments, the sensor(s) 110 may receive and/or transmit data from and/or to the processor(s) 120 over the network 145 via the network interface 140. Additionally or alternatively, the actuator(s) 130 may receive and/or transmit data from and/or to the processor(s) 120 over the network 145 via the network interface 140. For example, in some embodiments, one or more of the processor(s) 120 may be located on a remote site and communicate with the sensor(s) 110 and/or the actuator(s) 130 over the network 145 via the network interface 140 for acquiring information from the sensor(s) 110 and/or instructing the actuator(s) 130 to perform one or more actions with relation to the beehive as determined by the processor(s) 120.

The system 100 may comprise one or more input and/or output (I/O) device(s) such as 150 for receiving input from and/or providing output to a user. Exemplary I/O device(s) 150 may comprise one or more of: a touchscreen, a display, a keyboard, a mouse, voice activated software using speakers and microphone, and/or the like. Additionally or alternatively, one or more standalone devices communicating with processor(s) 120, e.g., via the network 145, may serve as I/O device(s) 150, such as for example, a mobile and/or stationary computing device such as a smartphone, a tablet computer, a desktop computer, and/or the like, running a suitable application program, may establish communication (e.g., cellular, network, short range wireless) with the processor(s) 120 using a communication interface (e.g., network interface, cellular interface, short range wireless network interface). The user may input data and/or receive data outputted by the respective device, e.g., by entering and/or viewing data on a display of a smartphone, optionally via a graphical user interface (GUI) application and/or the like.

The processor(s) 120 may be configured for receiving from sensor(s) 110 information and/or data acquired by sensor(s) 110 relating to contents of the beehive and/or of particular portions thereof. The processor(s) 120 may perform analysis of the data received from sensor(s) 110 to determine one or more attributes of one or more substances being monitored in the contents. The processor(s) 120 may apply an operational logic of the beehive on the determined substances attributes for determining one or more actions to be performed in relation to the beehive in response. The processor(s) 120 may instruct one or more of actuator(s) 130 to maneuver respective mechanical component(s) of the beehive for carrying out the action(s) determined.

In some embodiments, processor(s) 120 may determine to output information and/or data to a user in response to the determined substances attributes, such as for example, an indication of certain attribute(s) of certain substance(s), an indication of a required and/or recommended action to be performed by the user in relation to the beehive (e.g., moving to a different location), and/or the like. The information and/or data may be output to the user via I/O device(s) 150 and/or communicated to a user device (not shown) with network connectivity via the network interface 140 and the network 145.

The system 100 may comprise a data store such as 160 for storage and/or retrieval of data, such as for examples data records of the substances attributes determined by the processor(s) 120. The substances attributes may be recorded in the data store 160 along with timestamps documenting respective times and/or time ranges to which the recorded data of substances attributes correspond, e.g., a date, a time of day, and/or the like. The recorded data of substances attributes stored in data store 160 may be retrievable by a user and/or made available to interested stakeholders such as consumers, regulators, vendors, and/or the like in certification of a produce of the beehive, for example. The data store 160 may be implemented as, for example, a memory, a local hard-drive, a removable storage unit, an optical disk, a storage device, and/or as a remote server and/or computing cloud (e.g., accessed via a network connection).

In some embodiments, the processor(s) 120 may perform a comparison and/or integrative analysis of the substances attributes determined from the data of sensor(s) 110 and of historical data recorded in the data store 160, and based on such comparison and/or analysis determine one or more behavioral patterns of bees accommodated in the beehive, well-being parameters thereof, and/or any likewise information, which may be recorded in the data store 160 as well for further processing and/or usage, and/or used to determine actions to be performed in relation to the beehive in response to the determined pattern(s) and/or parameter(s).

In some embodiments, the processor(s) 120 may perform analysis of the substances attributes determined from the data of sensor(s) 110 in combination and/or cross-reference with additional information, such as for example environmental, agricultural, geographical, and/or likewise information and/or data relating to a surrounding environment of the beehive. The additional information may be for example an input obtained from a user via I/O device(s) 150, network interface 140 and/or the like, an information pre-stored in data store 160, and/or the like. Based on such analysis a determination of one or more behavioral patterns of bees accommodated in the beehive may be made, such as for example, locations and/or distances of travel and/or the like. The analysis results may be recorded in the data store 160 for future reference and/or further processing in response to further data from the sensor(s) 110, and/or may be used in determining one or more actions to be performed in relation to the beehive.

Figure 2:
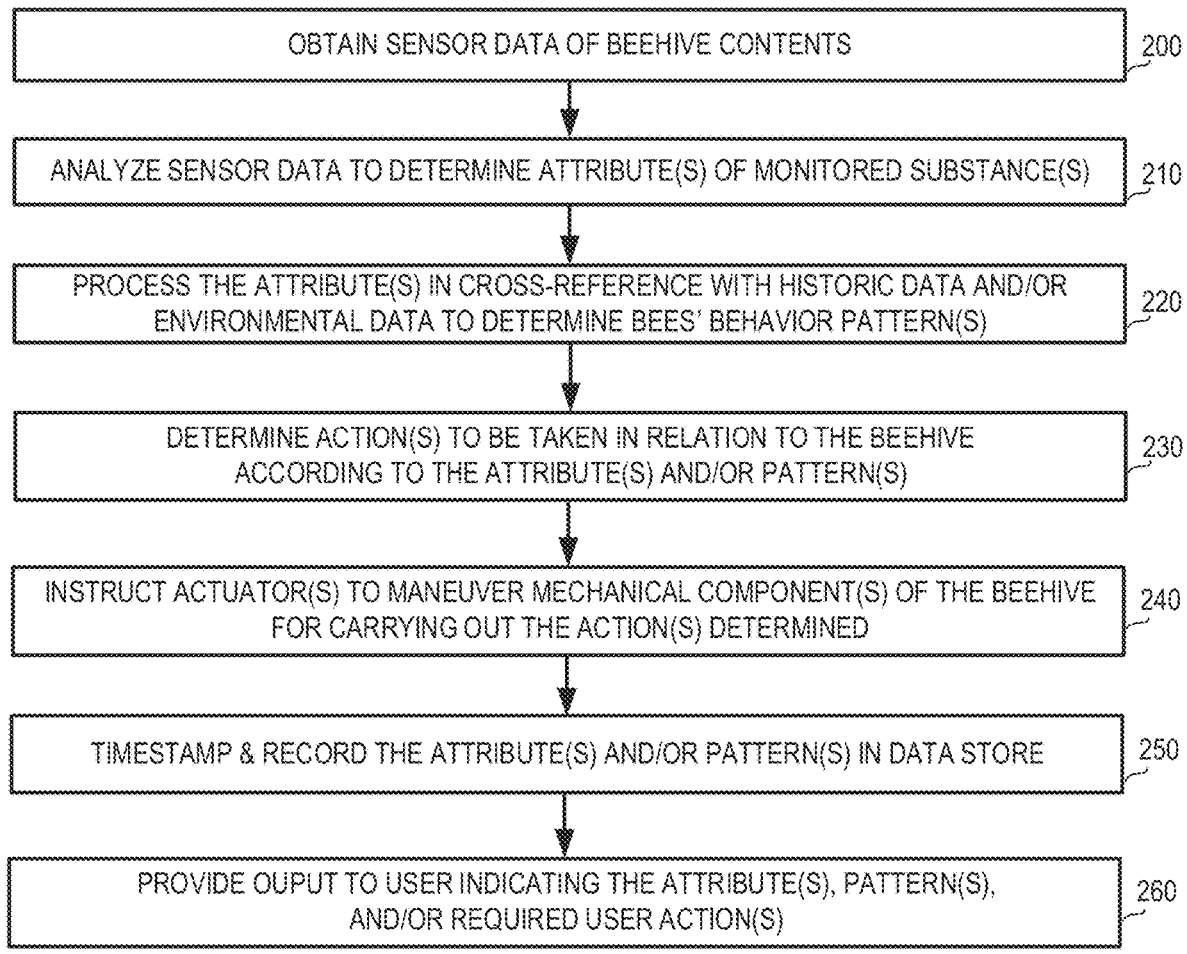
FIG. 2 is a flowchart schematically representing an optional flow of operations for automated beehive control and management, according to some embodiments.

Reference is now made to FIG. 2 which is a flowchart schematically representing an optional flow of operations for automated beehive control and management, according to some embodiments.

At 200 sensor data relating to contents of a beehive, such as the data gathered by sensor(s) 110 of FIG. 1, may be obtained.

At 210 the sensor data obtained at 200 may be analyzed to determine at least one attribute of at least one substance being monitored in the contents of the beehive. The monitored substance(s) may be of a sort that may be brought in by bees to the beehive, whether intentionally and/or incidentally.

At 220 the attribute(s) of the monitored substance(s) as determined at 210 may be processed in cross-reference with additional data originating at one or more other sources, such as for example historic data of attribute(s) of monitored substance(s) previously detected and recorded, pre-stored and/or user inputted data relating to environmental, agricultural, geographical, and/or any likewise conditions and/or characteristics of a surrounding environment of the beehive, and/or the like, and accordingly one or more behavioral pattern(s) and/or well-being parameter(s) of bees accommodated in the beehive may be determined. In some embodiments, such processing of composite information may be omitted and/or skipped in part and/or in entirety, and the procedure may continue to 230.

At 230 one or more actions to be taken in relation to the beehive in effect on at least a portion of an internal environment thereof may be determined according to the attribute(s) of the monitored substance(s) as determined at 210, and/or optionally further in accordance with the behavioral pattern(s) and/or well-being parameter(s) determined at 220. Exemplary actions may comprise honey harvesting, shutting hive openings, resizing hive capacity, dividing and/or merging hives, treating frames against pests, and/or the like. In some embodiments, the one or more actions may comprise one or more user actions recommended and/or required to be taken by a user in response to the attribute(s) and/or pattern(s).

At 240 one or more actuators of the beehive may be instructed to maneuver one or more mechanical components thereof for carrying out the action(s) determined at 230.

At 250 the attribute(s) determined at 210 and/or pattern(s) determined at 220 may be recorded in a data store. Optionally a corresponding timestamp may be assigned to the attribute(s) and/or pattern(s) and may be recorded in the data store too.

At 260 an output may be provided to a user where the attribute(s) determined at 210 and/or the pattern(s) determined at 220 may be indicated, for example in alert of the user thereto. The output may additionally or alternatively indicate one or more user actions suggested and/or required in response to the attribute(s) and/or pattern(s) as determined at 230. In some embodiments, such output provision may be omitted and/or skipped where deemed unnecessary, as applicable.

Reference is made to FIG. 3A which is a schematic illustration of an exemplary automated beehive assembly in which the disclosed subject matter may be utilized according to some embodiments. As shown, an automated beehive assembly such as 300 may comprise a plurality of honeycombs and/or frames such as 310 which may be arranged in rows along a main body and/or a boundary (e.g., sides, and/or walls) of the automated beehive assembly 300. For simplicity, frames 310 are collectively referred to herein as frames 310 or individually as a frame 310.

Generally, a frame as referred to herein may be a rectangle and/or other structural element in a beehive which may house and/or hold a honeycomb or brood comb. For simplicity, where applicable and unless specifically indicated, the terms "honeycomb" and "frame" as used herein may refer to the same thing and may thus be used interchangeably. As further shown, the automated beehive assembly 300 may comprise a frame loader (also referred to herein as an actuator or robot) 305 that may be configured to move over and/or above frames 310 as illustrated by arrows 320. For example, a controller such as a processor 120 of FIG. 1 (not shown in FIG. 3A) may control electric and/or other motors that may be configured to drive and/or mobilize frame loader 305 along directions shown by arrows 320 such that frame loader 305 may be positioned above a specifically selected frame 310. For the sake of clarity, rails, tubes, power cables, electric and/or pneumatic motors used for mobilizing frame loader 305 and/or for powering and/or activating components inside frame loader 305 are not shown. Frame loader 305 may comprise a mechanism for gripping and lifting, and/or pulling up a frame 310. In some embodiments, frame loader 305 may comprise and/or be coupled to one or more sensors such as 110 of FIG. 1 as described herein, e.g. sensor(s) 110 may be mounted on frame loader 305 and/or the like.

As further shown, the automated beehive assembly 300 may comprise a monitoring and/or treatment unit and/or chamber such as 330. In some embodiments, unit 330 may be a monitoring unit, e.g., containing sensors 110. Additionally or alternatively, unit 330 may be configured to treat frames, e.g., unit 330 may comprise one or more heating elements that may destroy pests using heat, and/or unit 330 may comprise one or more nozzles for discharging a substance and/or mixture of substances used for spraying, and/or otherwise treating frames.

In some embodiments, frame loader 305 may lift, pull and/or extracts a frame 310, carry the frame 310 to a monitoring unit such as 330 and place the frame 310 in monitoring unit 330. For example, in a first configuration according to some embodiments, frame loader 305 may be a light weight assembly that may only pull frames 310 and carry the frames 310 to monitoring and/or treatment unit 330 (e.g., frame loader may not comprise any sensors and/or monitoring and/or treatment units) while in a second configuration according to some further embodiments, frame loader 305 may comprise sensors 110 while unit 330 may be employed for treatment of frames 310. It will be understood that any combination and/or distribution of sensors used for monitoring and/or treatment components and/or units between frame loader 305 and unit 330 is possible.

As described, using input from sensors 110 in frame loader 305 and/or in unit 330, a controller operating the automated beehive assembly 300 (e.g., processor 120) may identify, determine and/or calculate a metric related to one or more substances carried, or brought, into beehive 300, by bees. Based on identifying a specific substance brought in by bees, and/or based on a metric (e.g., type, amount, weight, purity, and/or the like), the automated beehive assembly 300 may perform various actions.

For example, some species of bees carry pollen using corbiculae, also called pollen baskets, on their hind legs, whereas other species use scopae. Using a camera in frame loader 305 and/or in monitoring unit 330, images of bees in the beehive 300 may be continuously, periodically and/or repeatedly acquired and, using image processing applied, for example, by processor 120 to the acquired images, an average size of (or number of filled) pollen baskets or scopae, per bee or per colony, may be calculated.

Accordingly, an increase and/or decrease of pollen brought into the beehive 300 may be calculated and/or determined. By continuously, periodically or repeatedly calculating an average size of (or number of filled) pollen baskets or scopae, beehive 300 thus facilitates a function of closely monitoring the amount of pollen brought into beehive 300. Therefore, unlike pre-existing system and methods, beehive 300 may be able to respond substantially immediately to changing conditions, e.g., a decrease in pollen available to bees and/or the like.

Additionally or alternatively, similar procedures and/or techniques may be used with relation to a type of pollen brought into beehive 300 by bees, e.g., by applying image processing as described, a color of pollen carried in by bees may be determined, and any subsequent change and/or deviation from a first pollen type brought into beehive 300 by bees to a second, different pollen type may be identified substantially in real-time, e.g., within minutes upon such change and/or deviation. Additionally or alternatively, a type of pollen carried in by bees may be tracked and/or monitored using tools and/or techniques other than imaging and image processing, e.g., chemical and/or any other applicable sensors may be used.

Reference is additionally made to FIG. 3B which schematically illustrates different types of frames 310 (not honeycombs) that frame loader 305 may mount onto beehive 300, e.g., between other frames 310. For example, as shown in FIG. 3B, types of frames 310 may comprise a frame such as 304 which is a Queen-excluder frame comprising a mesh through which regular, working bees, can pass while, due to its larger size, a queen bee cannot cross or pass, a frame such as 302 which is a regular, brood frame to be used by bees accommodated in the beehive as known in the art, a frame such as 306 which is a feeding frame comprising a container that can be filled with food, e.g., a mixture of sugar and water, a frame such as 308 which is a partition frame that can be used to separate sections of the beehive 300, e.g., in order to divide a colony or hive in two, frame loader 305 may extract a regular frame 202 and replace it by (insert in its place) a partition frame 308, and/or the like. Accordingly, e.g., based on an amount, type and/or purity of pollen brought in, beehive 300 can automatically and/or autonomously vary the number of frames 310 allocated for each colony in beehive 300, as well as vary the size of the brood and/or honey chambers of each individual colony, for example.

Generally, beehive 300 may accommodate more than one hive or colony. A hive or colony may be a set of bees and a queen bee that occupy a set of frames 310. Generally, hives may be kept separated using partition frames 308 as described herein.

Additionally or alternatively, based on identifying that low quantity of pollen and/or nectar is brought in, a controller of beehive 300 (e.g., processor(s) 120) may determine that there may not be enough food for the bees and/or larvae (and/or predict a shortage of food in the near future) and instruct to insert, e.g., cause frame loader 305 to insert, a feeding frame 306 in between frames 310.

As described herein, using a camera and/or other sensors such as 110 of FIG. 1, beehive 300 can identify pesticides brought into the beehive 300. In some embodiments, immediately upon identifying pests brought in, a controller of the beehive such as processor 120 may cause frame loader 305 to carry an infected frame 310 to unit 330 where pests can be treated, e.g., using heaters or radiation components included in unit 330. Accordingly, by closely monitoring substance brought in by bees, beehive 300 can promptly deal with pests, substantially immediately upon their arrival at the beehive. Closely and continuously monitoring substances as described, accompanied by an immediate and autonomous action as provided for by the disclosed subject matter, thus achieves great advantages over pre-existing systems and methods in which, in many cases, an infestation is identified too late, when a colony has already collapsed.

Similarly, the ability to add food immediately when shortage of food is detected or predicted (e.g., based on a decrease of pollen brought in) as provided for by the disclosed subject matter, achieves a great advantage over pre-existing systems and methods in which such shortage may only be acknowledged when the beehive is inspected by the beekeeper.

Likewise, the ability of beehive 300 to automatically, autonomously and promptly vary the size of hives based on an amount and/or quality of available food and/or other metrics as provided for by the disclosed subject matter, achieves an advantage over pre-existing systems in which shortage of food may be discovered too late for saving a colony.

As described, beehive 300 may automatically and autonomously respond and/or act based on identifying and/or determining conditions relating to the beehive 300, e.g., outside beehive 300. Reference is additionally made to FIGS. 3C, 3D and 3E which show openings 350 through which bees can enter and exit beehive 300. Also shown is a shutter 360 which may be manipulated, driven and/or moved (e.g., by an electric motor in response to a command from a controller such as processor 120) such that it may cover and/or shut openings 350. For example, as shown in FIG. 3C, openings 350 may be fully exposed allowing free movement of bees in and out of beehive 300, or as shown in FIG. 3D, openings 350 may be partially covered by shutter 360, e.g., still allowing bees to exit and enter beehive 300 but reducing air flow in and out of beehive 300 or, as shown in FIG. 3E, openings 350 may be shut by shutter 360. For example, having identified (by a controller such as processor 120 and based on input from one or more of sensors 110) water droplets, ash and/or pesticides, on bees entering beehive 300, the controller (processor 120) may cause an actuator (e.g., a motor, an assembly, and/or the like) such as 130 to maneuver and/or translate shutter 360 and partially close openings 350 as shown in FIG. 3D. Additionally or alternatively, in some embodiments, e.g., in response to determining that a fire is raging outside based on amount and/or temperature of ash brought in by bees, the controller (processor 120) may completely seal beehive 300 by causing an assembly (actuator 130) to displace and mobilize shutter 360 to a sealing position such as shown in FIG. 3E. Additionally or alternatively, other actions may be performed, e.g., in case of a storm detected and/or otherwise acknowledged, e.g., by an input from a user, beehive 300 may activate a heater and/or an air conditioning system in order to heat and/or dry frames 310.

The ability of beehive 300 to automatically, immediately and autonomously respond to changing conditions outside and/or inside the beehive, as provided for by the disclosed subject matter, achieves a great advantage over pre-existing systems and methods where such response or action are typically performed a long time after conditions have changed, or worse, e.g., in case beehives are remotely placed, such response or action cannot be performed at all.

As described herein, purity and/or homogeneity of honey produced by beehive 300 may be observed, maintained and/or achieved by tracking pollen type brought in by bees and optionally initiating harvesting and/or alerting a user that, after a time period when bees collected pollen of a first type (from a first type of trees or flowers), bees have begun collecting pollen from a second, different type or trees or flowers, whereas clearly, such homogeneity or purity of honey cannot be achieved by pre-existing systems and methods. Moreover, beehive 300 can produce more than one type of homogeneous honey by tracking and recording different pollen types collected by bees in different hives in beehive 300. As described, by removing a partition frame 308 (and possibly removing a queen bee), beehive 300 can merge two hives into one, where such merger can be done if it is first determined, based on substance bees carry into beehive 300, that bees in colonies or hives to be merged collect the same type of pollen.

In some embodiments, a system for automated beehive control and management may comprise at least one sensor configured for acquiring information related to a content of a beehive, such as the beehive 300, and at least one processing circuitry being in communication with at least one actuator 130 of the beehive 300. For example, in some embodiments, sensors 110 may acquire information such as an image of a frame 310, temperature of a frames 310, and/or the information acquired by sensors 110 may describe chemical matter in and/or on frames 310. Additionally or alternatively, information acquired by the sensor(s) 110 may be audio produced by bees, e.g., as a result of wings flapping. A controller in the beehive such as processor 120 may receive information from the sensors 110 and may analyze the information to determine at least one attribute and/or metric of at least one substance in the beehive. For example, an amount and/or type of pollen brought into beehive 300 by bees may be determined by the controller (e.g. processor 120).

Based on a determined and/or identified attribute or metric, a controller may instruct at least one actuator in a system to maneuver at least one mechanical component effecting at least a portion of an internal environment of the beehive. For example, the controller (processor 120) may cause a mechanical component such as frame loader 305 to extract a frame 310, insert the frame 310 into monitoring and/or treatment unit 330, activate unit 330 and/or the like, and/or 120 may activate shutter 360 as described.

In some embodiments, a processing circuitry such as processor 120 may be in communication with a storage device such as data store 160 and the processing circuitry may record, in the storage device, a set of attributes determined for the at least one substance. For example, a controller (processor 120) may be operatively connected to a storage system such as data store 160 and may record thereon the type of pollen bees carry into beehive 300 as well as other substance or matter detected in beehive 300. Accordingly, embodiments of the disclosed subject matter can record, produce and provide a certificate that indicates the exact types of pollen from which honey was produced as well as a recordation (even residual or minor amounts) of any substance or matter that may be present in honey produced by beehive 300. Recordation of substance found and/or detected in beehive 300 may be associated with a timestamp indicating, for at least some of the substances detected, when exactly detection occurred.

Accordingly, in addition to associating produced honey with a recordation of substances that may be included in the honey (or involved in the production of the honey), a beehive such as 300 can produce a log of various environmental aspects, e.g., a pollution level and/or the like.

In some embodiments, the beehive 300 may comprise at least one modular unit and a mechanism for controlling a composite and/or subdivision configuration of the at least one modular unit. Such mechanism may comprise a mechanical arrangement which may be configured for being maneuvered by actuator(s) 130 and for performing at least one of: selectively dividing one or more modular units into a plurality of sub units, selectively merging to a super unit a plurality of the at least one modular unit and/or sub units, and/or any combination of selective subdivision and/or merger operations. For example, based on a command and/or instruction from a controller such as processor 120, frame loader 305 may insert a partition frame 308 between frames 310 to thus divide a colony or hive into two separate hives. Additionally or alternatively, a partition frame 308 may be removed by frame loader 305 to thus merge two colonies or hives.

In some embodiments, a beehive such as 300 may comprise one or more modular units comprising a volumetrically adjustable space, and a mechanism for controlling capacity of one or more of the modular unit(s). The mechanism may comprise a mechanical arrangement which may be configured for being maneuvered by actuator(s) 130, for selectively expanding and/or contracting the volumetrically adjustable space of one or more of the modular unit(s), for adjusting capacity of one or more modular unit(s). For example, frame loader 305 may remove and/or displace to a different location a partition frame 308 and/or add frames 310 to previously unoccupied space(s) to thus expand and/or enlarge an overall space available to a colony or hive in beehive 300.

In some embodiments, a beehive such as 300 may comprise at least one substance delivery mechanism coupled to at least one substance reservoir. The substance delivery mechanism may comprise a mechanical arrangement configured for being maneuvered by actuator(s) 130. A controller such as processor 120 may instruct actuator(s) 130 to maneuver the mechanical arrangement for delivering into the beehive 300 a predefined amount of content from the at least one substance reservoir coupled to the delivery mechanism. For example, frame loader 305 may carry a feeding frame 306 to a sugar solution tank (not shown), a conduit arrangement may fill the feeding frame 306 with sugar water and/or other substance, and frame loader 305 may place the (now filled with food) frame 306 in a hive thus feeding a colony of bees. In some embodiments, an automated beehive 300 may comprise an arrangement for pest control and an actuator 130 that maneuvers frames to the arrangement. For example, monitoring and treatment unit 330 may be an incubator that heats frames to a temperature that destroys pests, such as *Varroa destructor* mite, yet is harmless to bees. In other embodiments, an arrangement for treating pests may be carried by frame loader 305 and brought to proximity of frames 310 that need treating.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant automated beehive control and management tools and/or techniques will be developed and the scope of the term "automated beehive control and management" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict. Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for automated beehive control and management, comprising:

at least one processing circuitry being in communication with at least one sensor configured for acquiring information related to a content of a beehive and with at least one actuator of the beehive, the beehive having a plurality of states mechanically configurable using the at least one actuator to maneuver at least one mechanical component affecting at least a portion of an internal environment of the beehive, the plurality of states differing from one another in respective spatial distributions of the content within an interior portion of the beehive induced thereby, the at least one processing circuitry being adapted for:
receiving the information from the at least one sensor;
analyzing the information to determine at least one attribute of at least one substance monitored in the content, wherein the at least one attribute comprises at least one of a substance type and a substance chemical composition, and wherein determination of the at least one attribute comprising identifying in the content at least one substance brought in by bees to the beehive; and
based on the at least one attribute, instructing the at least one actuator to maneuver the at least one mechanical component for configuring a state of the beehive from the plurality of states in response to the determination, wherein the state corresponds to at least one requirement for at least one produce of the beehive;

wherein the beehive is adapted to accommodate a plurality of comb frames, wherein the at least one actuator is adapted to maneuver the at least one mechanical component for performing at least one of removing from and inserting into the beehive at least one comb frame, wherein the beehive comprising a plurality of size adjustable openings via which bees enter and exit the beehive, wherein the at least one actuator controls a size of the at least one adjustable opening by selectively enlarging and diminishing the at least one adjustable opening, wherein configuring the state of the beehive comprising at least one of: insertion of at least one comb frame into the beehive, removal of at least one comb frame from the beehive, substitution of at least one comb frame in the beehive by another comb frame of a different type, and adjusting a size of at least one of the plurality of size adjustable openings.

2. The system of claim 1, wherein the at least one sensor comprises at least one member selected from the group consisting of:

(i) an imaging sensor selected from the group consisting of: a visual light camera accompanied with a light source, an electromagnetic radiation imaging device, an Infrared (IR) imaging device, an Ultraviolet (UV) imaging device, a depth camera, a thermal vision camera, a spectral imaging sensor, a scanner, a light detection and ranging (LiDAR) device, and a radio azimuth direction and ranging (RADAR) device;

(ii) an acoustic sensor selected from the group consisting of: a microphone; an ultrasonic sensor device; and a Doppler ranging device;

(iii) a chemical sensor; and (iv) a mass density measuring device selected from the group consisting of: a weight scale and a mass scale.

3. The system of claim 1, wherein the at least one processing circuitry is in communication with a storage device and further adapted for recording in the storage device the set of attributes determined for the at least one substance.

4. The system of claim 3, wherein the at least one processing circuitry is further adapted for associating with the set of attributes and recording in the data storage device a respective timestamp.

5. The system of claim 1, wherein the beehive further comprising at least one modular unit comprising a composite and/or subdivision configuration, wherein the at least one actuator is configured for selectively dividing one or more of the at least one modular unit into a plurality of sub units or selectively merging to a super unit a plurality of the at least one modular unit and/or sub units.

6. The system of claim 1, wherein the beehive further comprising at least one modular unit comprising a volumetrically adjustable space, wherein the at least one actuator is configured for selectively expanding or contracting the volumetrically adjustable space of the at least one modular unit.

7. The system of claim 1, wherein the at least one actuator controls at least one climate condition of the beehive.

8. The system of claim 1, wherein the at least one actuator is configured to deliver content from at least one substance reservoir to the beehive.

9. The system of claim 1, wherein the least one processing circuitry instructs the at least one actuator to maneuver a removable portion to harvest honey from the removable portion.

10. The system of claim 1, wherein the at least one processing circuitry is further adapted for: receiving an input indicative of at least one of agricultural, environmental and geographical data relating to a surrounding environment in which the beehive being located and determining, based on the input and the at least one attribute, at least one travel behavior characteristic of occupant bees of the beehive, wherein the at least one processing circuitry is further adapted for instructing the at least one actuator to maneuver the at least one mechanical component based on the at least one travel behavior characteristic.

11. The system of claim 1, wherein the at least one processing circuitry is further adapted for providing, based on the at least one attribute, an output of at least one of: a user alert, and an indication of a user action to be performed in relation to the beehive.

12. The system of claim 1, wherein the at least one attribute comprises one or more attributes selected from the group consisting of: substance presence, substance amount, substance color, substance purity, and substance sugar concentration level.

13. The system of claim 1, wherein the at least one substance comprises one or more substances selected from the group consisting of: pollen, nectar, soil, plant part, resin, tree sap, water, ash, and pests.

14. The system of claim 1, wherein the beehive is operated by the at least one processing circuitry to treat pests in a removable portion of the beehive, wherein the at least one actuator repositions the removable portion, and wherein the removable portion is treated against pests.

15. A method for automated beehive control and management, comprising:
receiving from at least one sensor information related to a content of a beehive, the beehive having a plurality of states mechanically configurable using at least one actuator of the beehive to maneuver at least one mechanical component affecting at least a portion of an internal environment of the beehive, the plurality of states differing from one another in respective spatial distributions of the content within an interior portion of the beehive induced thereby;
analyzing the information to determine at least one attribute of at least one substance monitored in the content, wherein the at least one attribute comprises at least one of a substance type and a substance chemical composition, and wherein determination of the at least one attribute comprising identifying in the content at least one substance brought in by bees to the beehive; and
based on the at least one attribute, instructing the at least one actuator to maneuver the at least one mechanical component for configuring a state of the beehive from the plurality of states in response to the determination, wherein the state corresponds to at least one requirement for at least one produce of the beehive;
wherein the beehive is adapted to accommodate a plurality of comb frames, wherein the at least one actuator is adapted to maneuver the at least one mechanical component for performing at least one of removing from and inserting into the beehive at least one comb frame,
wherein the beehive comprising a plurality of size adjustable openings via which bees enter and exit the beehive, wherein the at least one actuator controls a size of the at least one adjustable opening by selectively enlarging and diminishing the at least one adjustable opening,
wherein configuring the state of the beehive comprising at least one of: insertion of at least one comb frame into the beehive, removal of at least one comb frame from the beehive, substitution of at least one comb frame in the beehive by another comb frame of a different type, and adjusting a size of at least one of the plurality of size adjustable openings.

16. A computer program product comprising:
a non-transitory computer readable storage medium;
program instructions for executing, by a processor, a method for automated beehive control and management, the method comprising:
receiving from at least one sensor information related to a content of a beehive, the beehive having a plurality of states mechanically configurable using at least one actuator of the beehive to maneuver at least one mechanical component affecting at least a portion of an internal environment of the beehive s the plurality of states differing from one another in respective spatial distributions of the content within an interior portion of the beehive induced thereby;
analyzing the information to determine at least one attribute of at least one substance monitored in the content, wherein the at least one attribute comprises at least one of a substance type and a substance chemical composition, and wherein determination of the at least one attribute comprising identifying in the content at least one substance brought in by bees to the beehive; and
based on the at least one attribute, instructing the at least one actuator to maneuver the at least one mechanical component for configuring a state of the beehive from the plurality of states in response to the determination, wherein the state corresponds to at least one requirement for at least one produce of the beehive;

wherein the beehive is adapted to accommodate a plurality of comb frames, wherein the at least one actuator is adapted to maneuver the at least one mechanical component for performing at least one of removing from and inserting into the beehive at least one comb frame, wherein the beehive comprising a plurality of size adjustable openings via which bees enter and exit the beehive, wherein the at least one actuator controls a size of the at least one adjustable opening by selectively enlarging and diminishing the at least one adjustable opening, wherein configuring the state of the beehive comprising at least one of: insertion of at least one comb frame into the beehive, removal of at least one comb frame from the beehive, substitution of at least one comb frame in the beehive by another comb frame of a different type, and adjusting a size of at least one of the plurality of size adjustable openings.

17. The system of claim 1, wherein the at least one actuator is moved to manage air flow by partially closing an opening to a size that allows bees to travel into and out of the beehive.

18. The system of claim 1, wherein the at least one actuator is arranged internally in the beehive.

19. The system of claim 1, wherein the at least one actuator is assembled integrally into the beehive.

* * * * *